Patented Apr. 29, 1924.

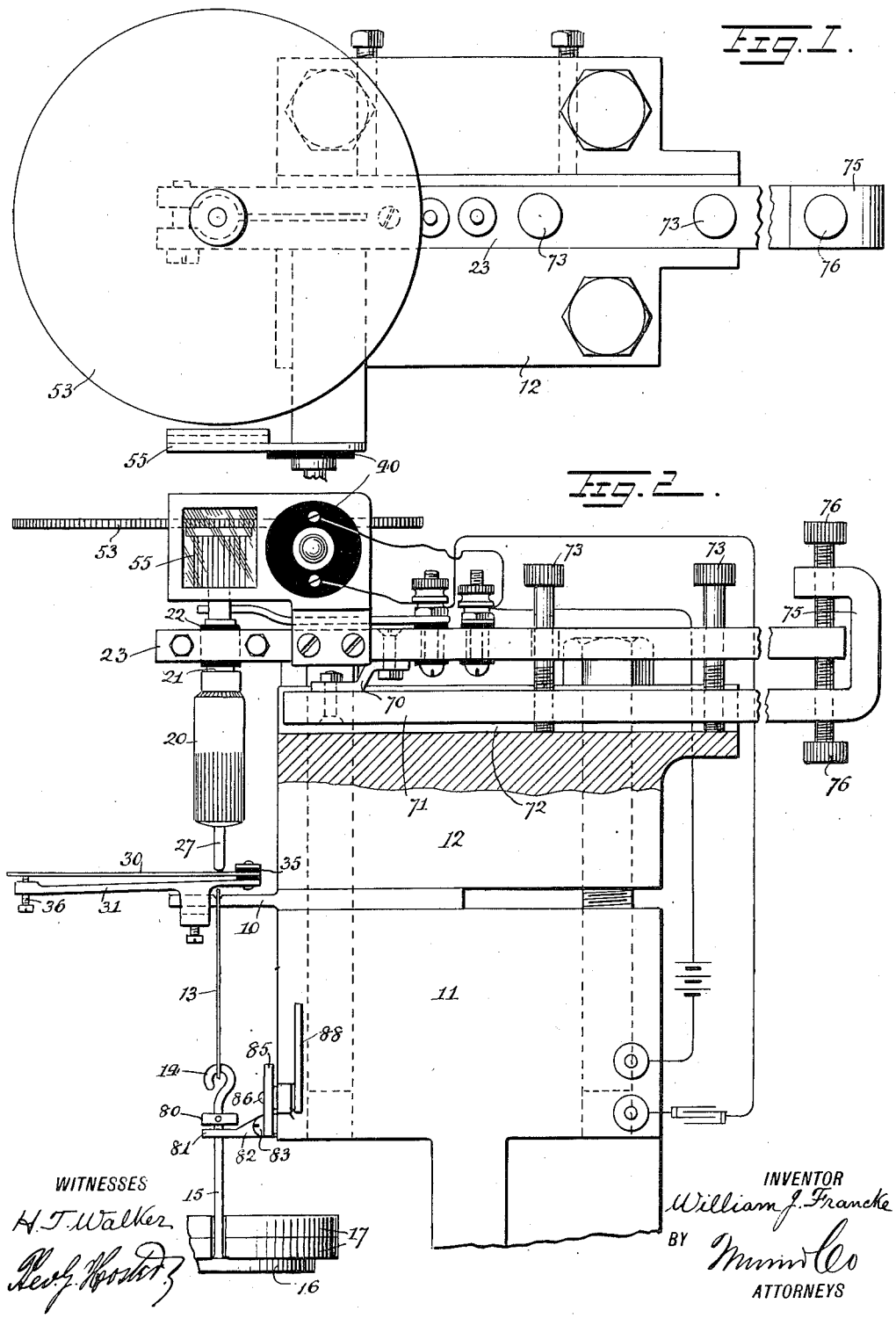

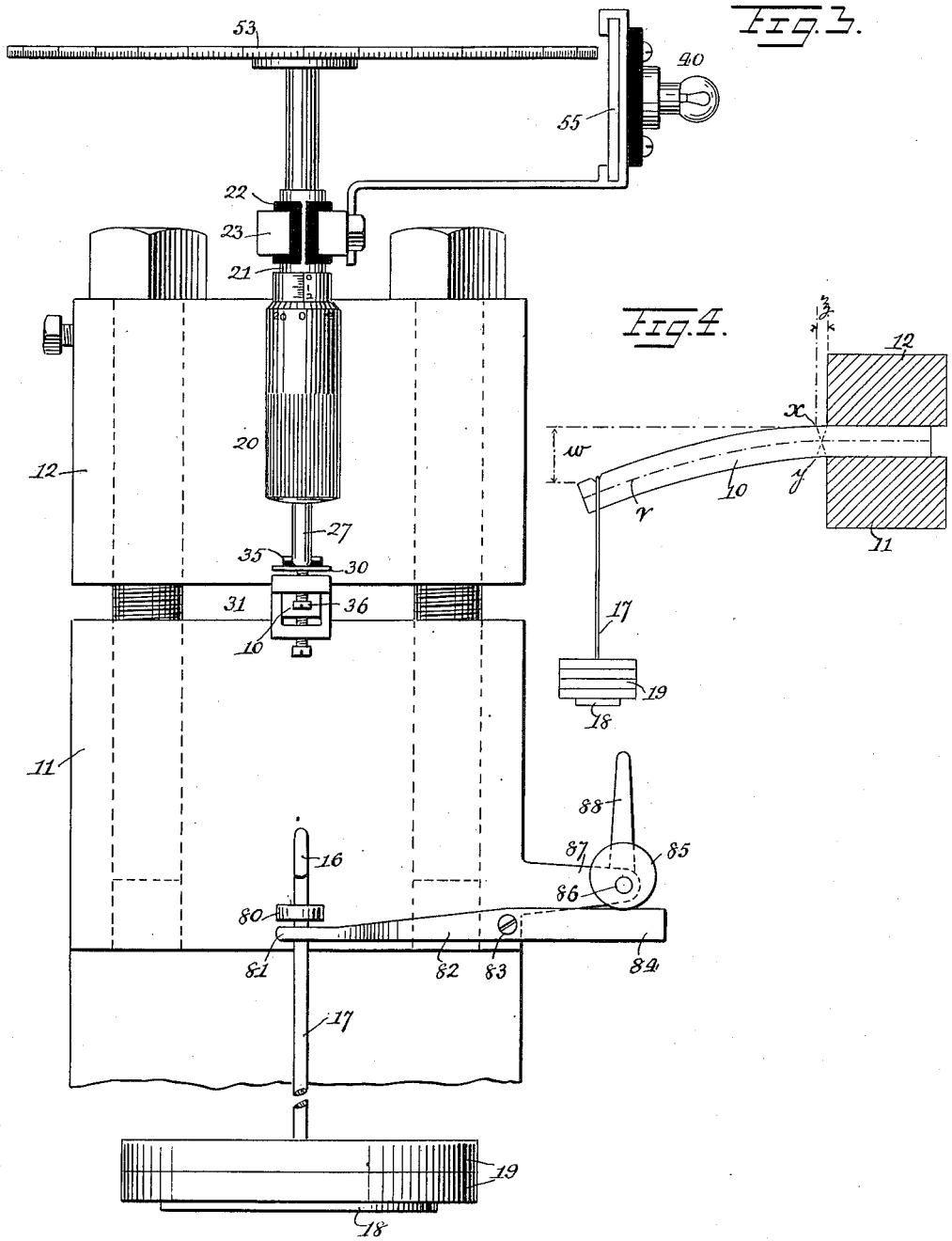

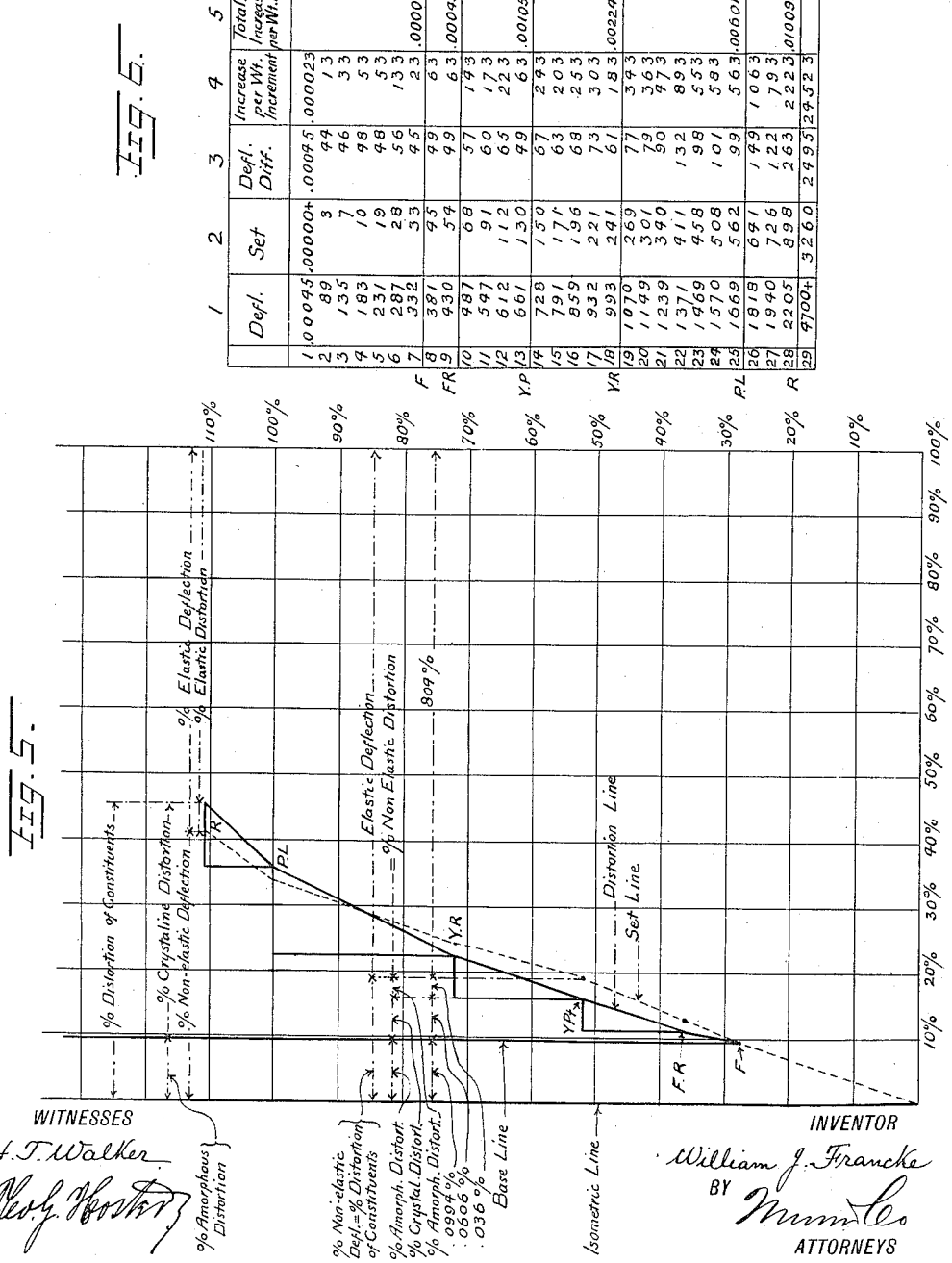

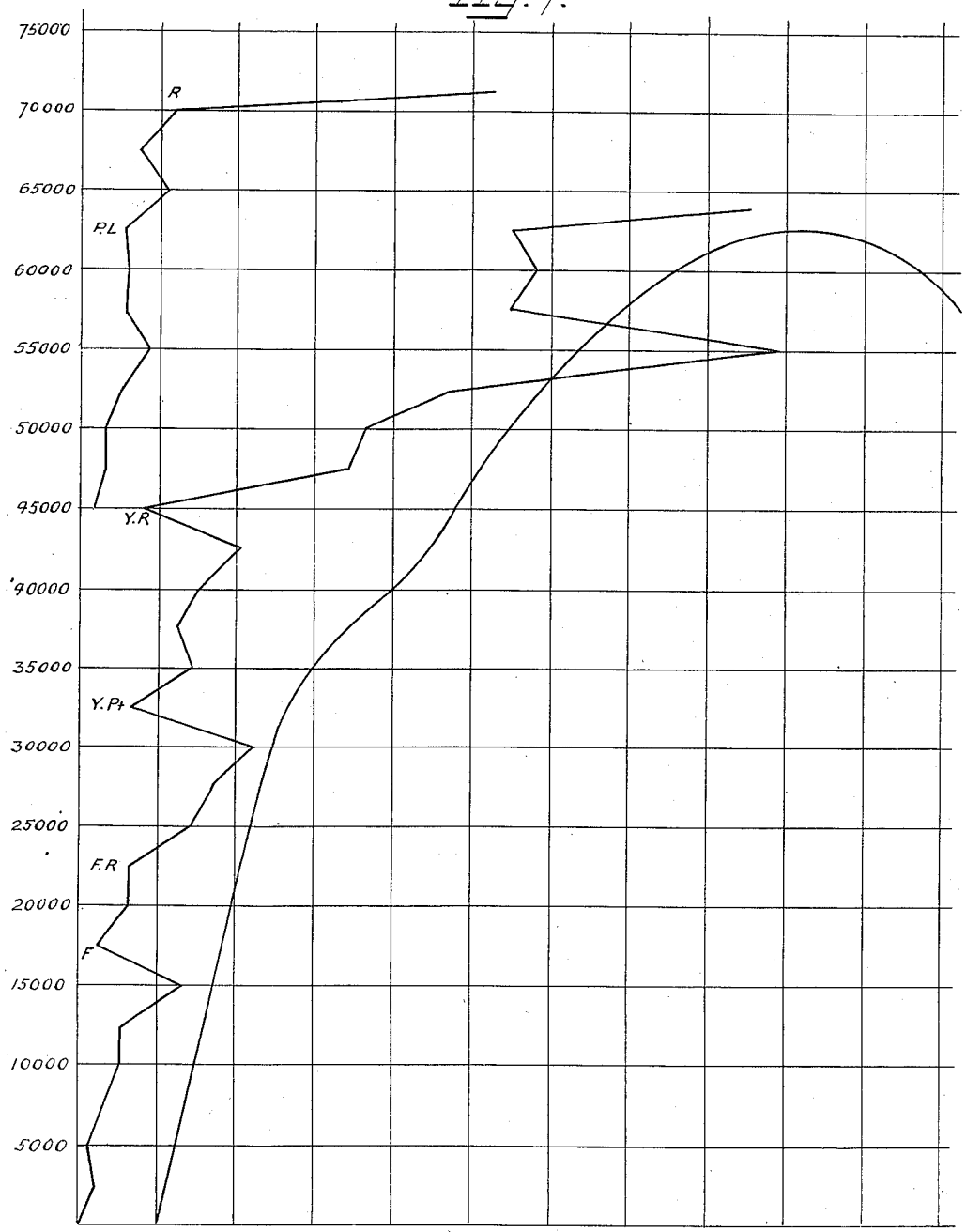

1,491,949

UNITED STATES PATENT OFFICE.

WILLIAM J. FRANCKE, OF HIGHLAND PARK, NEW JERSEY; ALLEN E. BEALS, OF PLAINFIELD, NEW JERSEY; RICHARD G. SAVOY, OF WESTFIELD, NEW JERSEY, AND RUSSELL E. WATSON, OF HIGHLAND PARK, NEW JERSEY, EXECUTORS OF SAID WILLIAM J. FRANCKE, DECEASED.

METHOD FOR TESTING MATERIALS.

Application filed March 9, 1920. Serial No. 364,563.

*To all whom it may concern:*

Be it known that I, WILLIAM J. FRANCKE, a citizen of the United States, and a resident of Highland Park, in the county of Middlesex and State of New Jersey, have invented a new and Improved Method for Testing Materials, of which the following is a full, clear, and exact description.

The object of the invention is to provide a new and improved method for testing the quality of materials, notably metals, by measuring the distortion that takes place in their crystalline, cellular or amorphous structure while under flexure strain.

Another object is to cause the deflection, which is slow in some material, to take place rapidly so that readings may be taken when the deflection is complete, thus eliminating errors in readings which are caused by the influence of elastic after effect or slowness.

The method for mechanically testing materials consists essentially in subjecting a test specimen of the material to repeated deflections under increasing stresses, measuring successive deflections of the test specimen and determining thereby the amount of the distortion in the constituents of the material between successive deflections.

In order to carry this method into effect, use is made of a testing machine such, for instance, as shown and described in the application for Letters Patent of the United States, Serial No. 244,220, filed by me on July 10, 1918.

Reference is to be had to the accompanying drawings forming a part of this specification, in which similar characters of reference indicate corresponding parts in all the views.

Figure 1 is a plan view of the testing machine used for carrying out my improved method;

Figure 2 is a front elevation of the same with a portion of the upper clamping jaw shown partly in section;

Figure 3 is an enlarged side elevation of the same;

Figure 4 is an enlarged view of the test specimen when in deflected position;

Figure 5 is a view of the plotting chart;

Figure 6 is the data sheet showing the results of a test made according to my improved method; and Figure 7 is a diagram of the increase per weight increment set forth in column 4, Figure 6.

The test specimen 10 is clamped at one end between two jaws 11 and 12, and on the projecting end of the test piece is hung a bridle 13 engaged by a hook 14 on the upper end of a rod 15 provided with a holder 16 adapted to support superimposed weights 17 to provide a pressure device to flex or deflect in a downward direction the projecting end of the test specimen 10, as hereinafter more fully explained.

In order to read the amount of flexure or deflection after a weight 17 is placed on the holder 16, use is made of a micrometer 20 having a graduated post 21 clamped between two jaws 22 of an insulating material and held in a supporting bar 23. The micrometer 20 is provided with the usual barrel from which depends integrally a contacting stem 27 moving up or down with the barrel on turning the latter either to the right or to the left. The stem 27 is magnetized and engages a movable member 30 of an electric switch 31 detachably fastened to the free end of the test piece 10. The movable member 30 of the switch is made of steel and one end thereof is held between blocks 35 of insulating material attached to the electric switch 31, and the free end of the movable member 30 normally engages a contact 36 held on the outer end of the electric switch 31. The movable member 30 is made very thin adjacent the blocks 35 thus forming a spring hinge to allow the member 30 to readily swing up and down. The member 30 is, however, sufficiently stiff to extend normally horizontally so that the contact 36 may be adjusted to make a light, sensitive contact with the member 30. It will be noticed that the micrometer stem 27 on account of being magnetized causes the member 30 to move with it on turning the barrel 26 so that the movable member 30 eventually makes contact with the contact 36 to close an electric circuit for an electric lamp 40 held insulated on the supporting bar 23. When the test specimen 10 is flexed or deflected downward by an additional weight 19 then the switch 31 moves with it.

The post 21 and the barrel of the micrometer 20 are provided with the usual graduations for reading the movement of the barrel by one thousandths of an inch, and with the barrel 26 rotates a disk 53 having a graduation on its peripheral edge, the markings of which are .0001 and are adapted to be read on a vernier 55 formed on a plate of glass attached to the support 23. By the arrangement described, the operator can obtain readings to one hundred thousandths of an inch. The lamp 40 is in an electric circuit containing the micrometer 20, the movable member 30 of the electric switch 31 and the test specimen 10. The supporting bar 23 for the micrometer has a fulcrum 70 made of lead or other non-elastic material and is attached to the bar 23 and to the base 71 held vertically adjustable in a recess 72 in the jaw 12 by the use of adjusting screws 73. A suitable adjusting mechanism such as screws 76, 77 is provided for adjusting the bar 23. It will be noticed that by the arrangement described the support 23 and the micrometer 20 are all rigid to eliminate inaccuracies or error due to lost motion incident to using the movable parts. By reference to Figures 1 and 2, it will be noticed that the inelastic fulcrum 70 is located near the micrometer 20 and is remote from the adjusting screws 76, 77 to permit of making a minute adjustment of the supporting bar 23 by the use of the screws 76, 77. It is understood that by the arrangement described, a quick adjustment of the micrometer can be had by raising or lowering the entire base or support 71.

The test specimen 10 while undergoing the test is subjected to a deflection. In some instances, the first or major portion of this deflection is rapid, while the last portion is slow, that is, extends through a longer period of time, the period varying according to the physical and chemical properties of the material. Accurate readings of the deflection cannot be obtained until the slow yielding has ceased, and as this final yielding may take hours it is impractical to make an accurate test in a reasonable length of time on slow, yielding material. In order to permit of obtaining accurate readings quickly a number of intermittent stresses are made by the operator repeatedly removing and replacing the weight. This has a tendency to shorten the time required for the test specimen to reach the maximum deflection for each weight. For this purpose the following arrangement is made: On the rod 15 of the weight support 16 is secured a collar 80 adapted to be engaged by the forked end 81 of a lever 82 fulcrumed at 83 on one side of the lower jaw 11. The end 84 of the lever 82 is engaged at the top by an eccentric 85 secured on a shaft 86 journaled in a bracket 87 attached to or forming part of the lower jaw 11. On the shaft 86 is secured a handle 88 under the control of the operator for turning the shaft 86 to cause the eccentric 85 to impart a swinging motion to the lever 82. After a weight 17 has been placed in position on the pressure device, the operator actuates the handle 88 a number of times to alternately raise and lower the weights, say about 50 to 100 times, to alternately lift and drop the weight relative to the test specimen to overcome the elastic after effect after the application of a weight. The lever 82 is normally out of engagement with the collar 80, and hence the lifting and dropping device is held in inactive position during the time the micrometer 20 is adjusted and the result of the flexure or deflection is read.

In carrying out the method, the operator places a weight 17 in position on the weight holder 16 to cause a deflection in the test specimen whereby the switch 31 is carried down with the free end of the test specimen. The weight 17 now exactly balances the strain in the test specimen and it is evident that any additional weight, even that caused by making an electrical contact would cause a greater deflection than that due to the weight. To prevent this greater deflection due to making contact, the hinged member 30 is permanently adjusted so as to make just a light contact. The micrometer is now screwed down, and being a magnet, it picks up the hinged member 30 thus preventing any additional weight or pressure of contact to affect the deflection caused by the weight 17. The micrometer is next screwed further down thus letting the member 30 down until the latter makes contact with the contact screw 36 thereby closing the circuit and lighting the lamp 40. The reading is taken as soon as the contact is made, the making of the contact being signalled to the operator by the lighting of the lamp 40. The reading of the deflection is set down in the first column of the data sheet shown in Figure 6, and then the micrometer is screwed up whereby the magnetized contact stem 27 lifts the member 30 so that a break in the circuit takes place and the lamp 40 is extinguished. It will be noticed that the circuit is broken at the contact point 36, which is platinum, and not at the point where the magnetized stem 27 picks up the member 30. The weight 17 is now removed to allow the test specimen 10 to spring back, and then a reading is taken to ascertain if it has or has not gone all the way back with a view to determine the permanent set. The amount of the permanent set is noted in the second column of the data sheet. Another weight 17 of the same number of pounds as the one already in position on the holder 16 is placed in position, and then the above described operation is repeated. It is understood that for each deflecting operation the whole weight is lifted on and off 50 to 100 times by the operator manipulating the handle 88, as above described, before the micrometer is screwed down to take the reading for the deflection and the reading for the permanent set. In many kinds of material this slow yielding is not present, and readings may be taken without lifting the weight on and off. After each complete deflecting action, another weight of a like number of pounds is added, and this operation is repeated until the test is completed to the rupture of the test specimen 10. It is understood that the series of flexure stresses to which the test specimen is first intermittently subjected forms one phase of the method, and the subsequent phases are similar with the difference that for each subsequent phase of deflecting action the weight is increased, preferably by adding weights each of the same number of pounds as the first weight.

It is characteristic of the tests that for nearly all material six points, representing physical changes in the material, are developed. In the diagram shown in Figure 5, the physical changes are shown at F, F R, Y Pt, Y R, P L, and R, meaning, respectively, fatigue, fatigue range, yield point, yield range, plastic limit, and rupture, the readings from each point to the next forming a group of readings. It is expressly understood that the test determines by means of the difference in deflection the distortion caused by each weight increment in the constituents of the material, that is, the distortion in the crystalline, cellular or amorphous constituents of the material is measured by means of the deflection of the specimen as distinct from measuring the change of shape of the test specimen as a whole, and then is determined how much of this distortion takes place between each point and the next one. It is understood that the change of shape of the specimen as a whole is herein considered as deformation, and the change of shape of a crystal due to slip or a movement in amorphous metal is distortion of structure.

By reference to Figure 4, it will be noticed that the point of greatest stress in tension is at $x$ and the point of greatest stress in compression is at $y$, and at these points the distortion in the constituent structure of the material is measured, the distance $z$ indicating the amount of the distortion of the constituents of the material. The whole amount of the change of the shape of the test specimen 10 is indicated at $w$. The letter $v$ indicates the neutral line of the test specimen under stress as a cantilever. It will be noticed that at the point of greatest stress the distance from the neutral line $v$ to the top or the bottom is the short arm of a lever of which the long arm is the neutral line to the point where the weight is applied. In a cantilever specimen the stress is localized at the vise jaw, as shown at $x$ (Figure 4). To intensify the localization of this stress so that the distortion caused by a slip on a cleavage plane may be determined by measuring the deflection of the test specimen at the point $w$ (Figure 4), specimens may be notched at this point. It is, however, not usually necessary to resort to this refinement. It will be noticed in the first group, in the first four readings in column 4, Figure 5, that some slight variation in increase in deflection per weight increment takes place even at these low stresses. These variations are presumably due to movement in the amorphous metal between crystals. The first distinct distortion of crystalline structure caused by slip in a cleavage plane is presumed to have taken place in this specimen when the fifth weight increment was applied, causing an increase in deflection for this fifth weight increment of thirty-eight one hundred thousandths of an inch.

To show where the group points are located, the increase for each weight increment, column 4, is plotted to any convenient scale, that above Y Pt may be taken at $\frac{1}{10}$ of that below Y Pt in material which is very ductile and yields freely. Such a curve is shown in Figure 7 in comparison with an ordinary stress-strain diagram, drawn to no scale and inserted only to show approximately at what part of the stress-strain diagram these group points appear. An examination of column 4 will show that in this case it was not necessary to plot this curve, as the distortion of the constituents of the material, indicating the location of the points is quite clearly shown in the column without plotting it.

By reference to Figure 6 it will be noted that in the third column is set down the difference between each deflection reading and the preceding deflection reading. This "difference" in deflection is entered in the third column for convenience in calculating the "increase" in deflection noted down in the fourth column. This increase in deflection is caused by movement in the constituents of the material, namely, movement in the amorphous metal and in the crystals. Movement in amorphous constituents may begin with the application of the first weight increment and continue more or less throughout the test. Movement in crystalline constituents through slip is presumed to begin at F although in some material there may be segregation of a weak element in the grain boundary of the material, causing the increase in deflection per weight increment at that point. In either event this method of testing measures the stress at which a change has taken place in the constituents of the material.

In order to separate the movement taking place in the amorphous constituent from that taking place in the crystalline constituents and to measure them, the following procedure is used: Up to F there is no slip in crystals, the movement taking place in amorphous metal and is measured by permanent set at that point. Beyond F the movement is in both amorphous metal and in crystals. If we take the total deflection at point F, or the sum of the differences at that point, which is the same thing, and subtract from it the set at point F, we have the deflection minus the movement which has taken place in amorphous metal, and also minus any movement in crystals, which movement is zero at the point F, we have the normal or ideal or, possibly, the theoretically perfectly elastic deflection of the specimen. However, this may be, this deflection is used in this method of testing as the basic deflection from which deflections at other points are measured. By dividing this sum of the differences in deflection at F, minus the set at F, by the number of weight increments at F we have the average basic deflection per weight increment, namely, the deflection per weight increment without the set and without any crystalline distortion. Subtracting this base deflection from the "differences" in column 3 gives the increase in deflection per weight increment entered in column 4. This base deflection per weight increment plotted against weight increments is a straight line and is used as the vertical line of origin of the diagram, Figure 5, and is called the isometric line, representing the isometric deflection of the material without set and without crystalline distortion. Column 4 is plotted to any convenient scale to determine the locations of points F, F R, Y Pt, Y R, F L, and R. When so determined the distortion in constituents of the material, or increases per weight increment up to each point, are added and entered in column 5, from which the curve in Figure 5 is plotted on a percentage basis using $$\frac{\text{distortion (col. 5)}}{\text{deflection (col. 1)}}$$

to plot the distortion line, and $$\frac{\text{set (col. 2)}}{\text{deflection (col. 1)}}$$

to plot the set line. Up to F this diagram shows distortion in the amorphous constituent only, above F it shows distortion in both the crystalline constituent and the amorphous constituent. At this point F in the diagram a vertical line is drawn upward representing the base from which crystalline distortion is measured. Above F the distortion taking place in amorphous or crystalline constituents varies in different materials.

In this specimen, during the flow period between F R and Y R, it is the set line which records the maximum distortion in constituents. During the plastic period above Y R it is the distortion line that records the maximum distortion in constituents. During the flow period, the specimen is deflected and a certain crystalline distortion recorded, on release, by removing the weights, the specimen does not recover all of the distortion, in such a case the set line records the amount not recovered, shown in the diagram as non-elastic distortion. During the plastic period the specimen is deflected and a certain distortion recorded, on release, by removing the weights all this distortion is recovered and an additional amount is recovered shown on the diagram as elastic distortion. These conditions vary in different materials and the amount of elastic distortion becomes a measure of the elastic quality of the material.

In order to fully disclose the method, it is assumed that specimen of medium carbon steel is under test. The constituents of the piece are then; amorphous metal, iron crystals (ferrite), and a mechanical mixture of iron crystals and carbide of iron crystals (cementite) called pearlite. The free ferrite, or ferrite unmixed with cementite, is the weaker of the crystalline constituents. Under stress movement takes place in the amorphous constituent and in the crystalline constituents of the material. Movement in the crystals takes place through "slip" in their cleavage planes. This slip is a well known phenomena, demonstrated by Rosenhain and others. It causes distortion in the crystalline structure made manifest in this method of testing by an increase in deflection of the test specimen, movement in the amorphous metal constituent is also made manifest by increase in deflection of the test specimen. This increase in deflection is so slight that it cannot be shown clearly by plotting a curve for the deflection, but it is shown quite clearly by plotting a curve for the increase in deflection per weight increment. Under stress caused by adding one weight increment after another, movement first takes place in the amorphous constituent, the increase in deflection caused by this movement is slight, may be variable, or gradually increasing, but the readings of deflection increase from a group or readings up to the point where distortion in the ferrite begins. This group is shown in column 4 up to the point F in Figure 5. At the point F slip begins to take place in the ferrite constituent, the readings of increase in deflection again forming a group up to F R in column 4. A portion of this movement is probably caused by a continuance of movement in amorphous metal also. At the point F R a further increase in deflection per weight increment takes place to Y R caused by movement in the pearlite constituent. This movement is divided into two groups of readings by the point Y Pt. At the point Y Pt, or yield point, there is probably no movement in any single constituent of the material.

According to Beilby's conception of "slip" now quite generally accepted, amorphous metal is formed in the slip planes. This amorphous metal remains temporarily mobile and then hardens in a manner analogous to the hardening of cement. Up to the point F R slip in ferrite crystals had been sporadic, taking place in the individual crystals least favorably situated to withstand the stress and allowing time for the amorphous metal to harden. At the point F R movement begins to take place in the pearlite constituent, possibly through slip in the pearlite ferrite, but from whatever cause, the result is a greater deformation of the test specimen as a whole causing increasingly greater stress to be thrown on the ferrite crystals which now, losing the support of the stronger pearlite, slip in increasing number, slowly increasing at first, but soon reaching a point where the slip in many crystals becomes cumulative. Time is not allowed for the hardening of the cement and a "flow" takes place on many slip planes simultaneously causing the phenomena of the yield point manifested by the drop of the beam in a tensile testing machine, but not recording where failure has taken place in any individual constituent of the material, but recording rather a movement in amorphous metal in the slip planes, manifested in this method of testing by the set line between F R and Y R and shown in Figure 5 as non-elastic distortion. At Y R the "flow" caused by mobile amorphous ceases due to the hardening of the amorphous metal permitted by slowing up of the flow due to a gradually decreasing number of large crystals which have been divided and subdivided by slip, and to the exhaustion of the supply of crystals unfavorably situated to resist stress.

The group of increase in deflection reading from Y R to P L record the movement in the constituents of strain hardened steel, the crystalline structure of the material having now undergone a change, which change was completed by the hardening of the amorphous metal, and is permanent except for a slow continuance of the hardening of the amorphous metal shown by a higher yield point, if tested after an interval of time. The effects of slight heating, heating to a temperature much below that at which any change takes place in crystalline constituents possible to discover by microphotography, can also be recorded and measured by this method of testing. The point R recovers where a change takes place in the structure of the strain hardened steel.

The horizontal leg of the triangles on the distortion line show the distortion that has taken place from each point to the next, and the vertical leg the stress caused by it. The angle this leg makes with the distortion line may therefore become a measure of the quality of material, namely, if F shows the stress at which slip first takes place, or the fatigue point, F R, is a measure of fatigue quality by showing small distortion under large stress or large distortion under small stress. Similarly it is quite probable that distortion during the flow period from Y Pt to Y R measures maleability as distinct from distortion during the plastic period, from Y R to P L, which probably measures ductility. It is conceivable that the amount of distortion at each point, and the stress that caused it may become an accurate measure of the physical properties of material. Material, for instance, that flows freely as indicated by large distortion under low stress between Y Pt and Y R will no doubt be suitable for deep drawing operations, while material that shows large distortion at small stress between Y R and P L will be suitable for wire drawing. Material that shows small distortion at high stress from P L to R will probably be tough.

The distortion caused per weight increment is rarely uniform, and is therefore not strictly proportionate to stress, as indeed it should not be, if the constituents of the material are really being tested. It frequently happens that quite a large distortion is recorded as if a particularly unfavorably situated crystal had failed through slip. Such slip may indeed sometimes be observed when all deflection seems to have ceased and then suddenly there will be more, to the value of say, .00004, when it will again cease and remain practically permanent. The next following weight increment may then produce considerably less distortion. Many tests show that the distortion per weight increment increases and again decreases from group point to group point.

It is understood that the linear measurement used is inches and subdivisions thereof.

Having thus described my invention, I claim as new and desire to secure by Letters Patent:

1. The steps in the herein described method for mechanically testing materials as to their quality which consists in subjecting a test specimen repeatedly and intermittently to a series of flexure stresses of the same power, and measuring the deformation and the permanent set at the end of the series of deflections.

2. The steps in the herein described method for mechanically testing materials as to their quality which consists in subjecting a test specimen repeatedly and intermittently to a series of stresses of the same power, measuring the distortion and the permanent set at the end of the series of deflections, then again subjecting the test specimen repeatedly and intermittently to a second series of stresses of a power which is a multiple of the said employed first power, and again measuring the distortion and the permanent set at the end of the second series of deflections.

3. The steps in the herein described method for mechanically testing materials as to their quality which consists in subjecting a test specimen repeatedly and intermittently to a series of stresses of the same power, measuring the distortion and the permanent set at the end of the series of deflections, and repeating the series of stresses on the test specimen with an increased power for each subsequent series.

4. The herein described method for testing materials which consists in subjecting a test specimen to a deflecting stress of a given power, determining the amount of the distortion and removing the deflecting stress to determine the permanent set produced by the spring back of the test specimen after removal of the deflecting stress, repeating the intermittent deflecting action a number of times by deflecting stresses of successively increased powers, and determining the distortion and the permanent set for each repeated deflecting action.

5. The herein described method for testing materials which consists in holding a test specimen at one end, subjecting the free end of the test specimen to a deflecting stress of a given power, determining the amount of the distortion, removing the deflecting stress to allow the test specimen to spring back, determining the amount of the permanent set incident to the spring back, repeating the intermittent application of the deflecting stresses with successively increased powers, and determining the distortion and permanent set for each repeated intermittent deflecting action.

6. The herein described method for testing materials which consists in holding a test specimen at one end, subjecting the free end of the test specimen repeatedly to the intermittent action of a deflecting stress of a given power, determining the amount of distortion and the permanent set produced by the said intermittent action of the applied stress, repeating the intermittent applications of deflecting stresses with successively increased powers, and determining the distortion and permanent set for each series of repeated intermittent deflecting actions of a deflecting stress of each increased power.

7. The herein described method for testing materials which consists in supporting tests pieces at one end, applying a weight to the free end of the test piece to deflect the latter, determining the amount of the distortion, removing the weight to allow the test piece to spring back by its own resiliency thus producing a permanent set, determining the permanent set, subjecting the test piece to the deflecting action of an increased weight, determining the amount of distortion, removing the increased weight to allow the test piece to swing back by its own resiliency to produce another permanent set, determining the difference of deflection of the deflecting operations to obtain the distortion, noting the distortion of each weight increment determined by substituting the base deflection from the differences in deflection of the whole test.

WILLIAM J. FRANCKE.